(12) United States Patent
Sohn

(10) Patent No.: US 8,890,053 B2
(45) Date of Patent: Nov. 18, 2014

(54) IMAGE SENSOR HAVING AN AUXILIARY AMPLIFICATION UNIT

(75) Inventor: Young Chul Sohn, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 313 days.

(21) Appl. No.: 13/493,706

(22) Filed: Jun. 11, 2012

(65) Prior Publication Data

US 2013/0032693 A1 Feb. 7, 2013

(30) Foreign Application Priority Data

Aug. 4, 2011 (KR) .................. 10-2011-0077813

(51) Int. Cl.
*H01L 31/00* (2006.01)
*H04N 5/378* (2011.01)

(52) U.S. Cl.
CPC .................................... *H04N 5/378* (2013.01)
USPC .................... 250/214.1; 250/208.1; 348/300; 348/301

(58) Field of Classification Search
USPC ........ 250/214 A, 214.1, 214 R, 208.2, 208.1; 348/294, 300, 301
See application file for complete search history.

(56) References Cited

U.S. PATENT DOCUMENTS

| 6,552,745 B1 * | 4/2003 | Perner .......................... 348/308 |
| 2005/0162530 A1 | 7/2005 | Matsui |
| 2006/0044440 A1 * | 3/2006 | Park et al. ..................... 348/308 |

FOREIGN PATENT DOCUMENTS

| JP | 2005210335 A | 4/2005 |
| KR | 1020070060632 A | 6/2007 |

* cited by examiner

*Primary Examiner* — Francis M Legasse, Jr.
(74) *Attorney, Agent, or Firm* — William Park & Associates Patent Ltd.

(57) ABSTRACT

Provided is an image sensor capable of supporting a high speed operation. The image sensor includes a plurality of sampling units sampling a pixel signal to output a sampled signal pair; an auxiliary amplification unit amplifying a signal of the sampled signal pair; and an amplification unit sensing a differential signal pair transmitted through the auxiliary amplification unit to generate output data.

5 Claims, 5 Drawing Sheets

IMAGE SENSOR HAVING AN AUXILIARY AMPLIFICATION UNIT

CROSS-REFERENCE TO RELATED APPLICATIONS

This application claims priority to Korean Patent Application No. 10-2011-0077813 filed on Aug. 4, 2011, in the Korean Intellectual Property Office, the disclosure of which is incorporated herein by reference in its entirety.

BACKGROUND OF THE INVENTION

1. Field of the Invention

The present invention relates to an image sensor and more particularly to an image sensor receiving a sampled signal with an increased voltage difference.

2. Description of the Related Art

In general, an image sensor is a semiconductor device for converting an optical image into an electrical signal. The image sensor may have a parallel column structure as shown in FIG. 1.

FIG. 1 is a block diagram of an image sensor according to the related art.

With reference to FIG. 1, an image sensor according to the related art may include a plurality of pixels 10 disposed in a two-dimensional N×M structure, a plurality of sampling units 20-1 to 20-N with which the plurality of pixels 10 are connected in column units, a single sense amplifier 30 connected in common with the plurality of sampling units 20-1 to 20-N, and the like. Each of the sampling units 20-1 to 20-N may include a comparison portion (21-1 to 21-N), a counting portion (22-1 to 22-N) and a storage portion (23-1 to 23-N). In FIG. 1, SLp and SLn may refer to a sampled signal line pair, and doutp and doutn may refer to respective sampled signals respectively transmitted through the signal line pair SLp and SLn.

Here, when pixel signals px1 to pxN are generated and output by the plurality of pixels 10, comparison portions 21-1 to 21-N compare a voltage of the received pixel signals px1 to pxN with a reference voltage vramp, and counting portions 22-1 to 22-N count time until output results out1 to outN from the comparison portions 21-1 to 21-N are inverted or non-inverted to thus generate sampled signals and then store the generated sampled signals in the storage portions 23-1 to 23-N.

Thereafter, the storage portions 23-1 to 23-N provide sampled signal pairs (doutp, doutn) to a sense amplification unit 30 in response to addresses input thereto, and the sense amplification unit 30 senses the received signal pairs to generate data to be provided to a digital block (not shown).

However, in order to perform a sensing operation using the sense amplification unit 30, a signal of the sampled signal pair (doutp, doutn) should have a predetermined voltage level or more. For example, a voltage difference $\Delta V$ between the sampled signal doutp and the sampled signal doutn should have a predetermined voltage level or more.

However, as shown in FIG. 1, when a plurality of sampling units 20-1 to 20-N are connected in common with a single sense amplification unit 30, there may be a defect in which time taken while a signal of the sampled signal pair (doutp, doutn), for example, a voltage difference between the sampled signal doutp and the sampled signal doutn, reaches any predetermined level or more thereof, is increased in proportion to an amount of image sensor pixels. That is, as the number of image sensor pixels increases, the number of sampling units 20-1 to 20-N also increases. Therefore, the sense amplification unit 30 is connected with a relatively large number of sampling units 20-1 to 20-N, and a length of the sampled signal line pair (SLp, SLn) between the sense amplification unit 30 and the sampling units 20-1 to 20-N is also increased.

As a result, in the case of increasing the number of pixels in an image sensor, a period of time taken for a signal of the sample signal pair (doutp, doutn) to reach a signal level having a predetermined voltage level or more also increases, and thus, data readout speed of the sense amplification unit 30 may be deteriorated in proportion to the increased time. Accordingly, an image sensor according to the related art has a defect in which high speed operations cannot be supported in the case of employing a large number of pixels.

SUMMARY OF THE INVENTION

An aspect of the present invention provides an image sensor capable of supporting operation at a high speed.

According to an aspect of the present invention, there is provided an image sensor including: an auxiliary amplification unit amplifying a signal of a sampled signal pair of sampled pixel signals; and an amplification unit sensing a differential signal pair transmitted through the auxiliary amplification unit to generate output data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

The present invention may be variably modified and may have various embodiments, particular examples of which will be illustrated in drawings and described in detail.

However, it should be understood that the following descriptions of the invention are not intended to restrict the invention to specific forms thereof, but rather the present invention is meant to cover all modifications, similarities and alternatives, included in the spirit and scope of the present invention.

Terms used in the present application, for example, a first, a second, or the like, are merely used to describe particular embodiments, and are not intended to limit the present invention. In the present application, it is to be understood that terms such as "including" or "having," etc., are intended to indicate the existence of features, numbers, operations, actions, components, parts, or combinations thereof disclosed in the specification, and are not intended to preclude the possibility that one or more other features, numbers, operations, actions, components, parts, or a combination thereof may exist or may be added.

Embodiments of the present invention will be described below in detail with reference to the accompanying drawings, where those components that are common or that correspond to one another are referred to by using a common reference number, regardless of the figure number, and redundant explanations are omitted.

Figure 1:
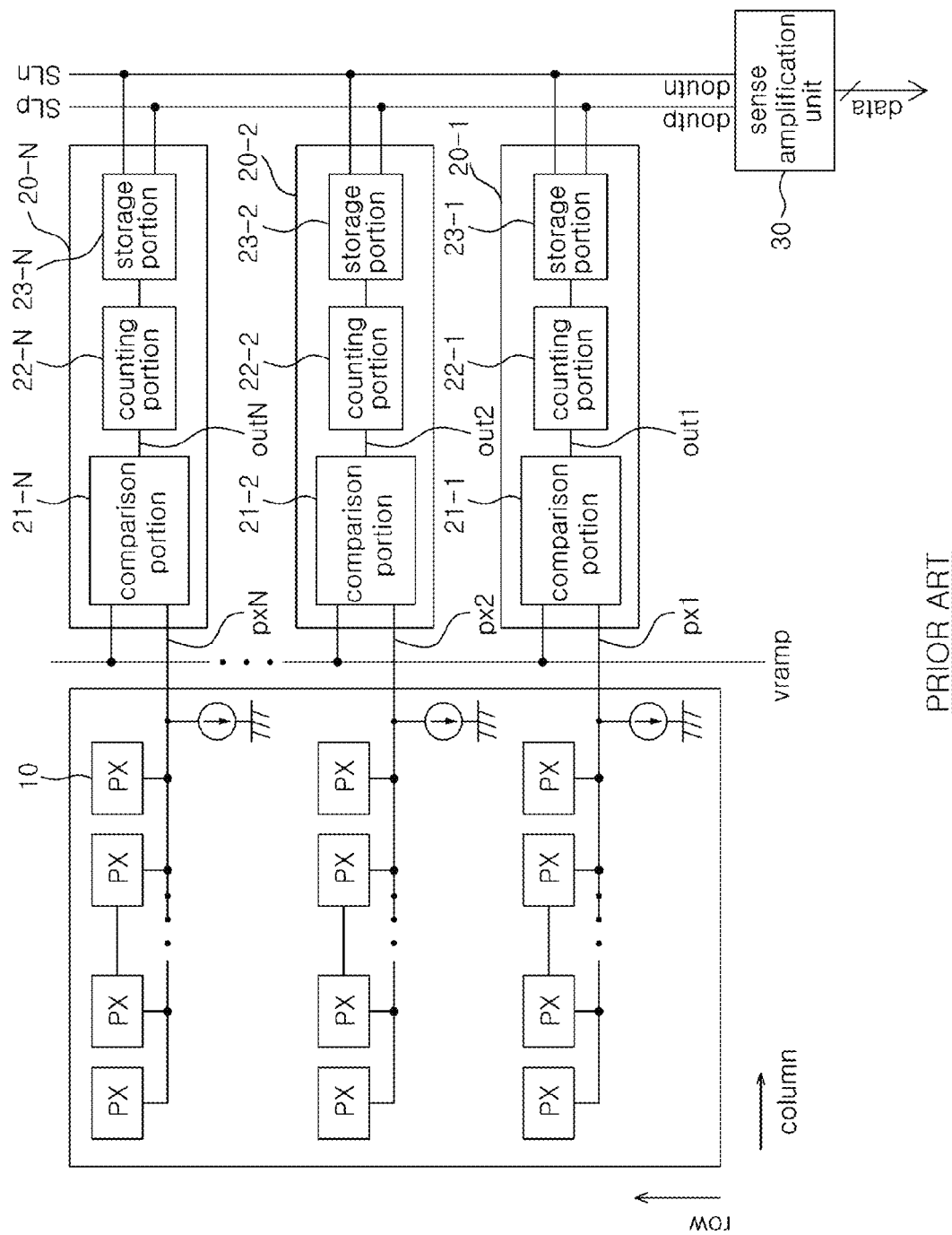
FIG. 1 is a block diagram of an image sensor according to the related art.
Figure 2:
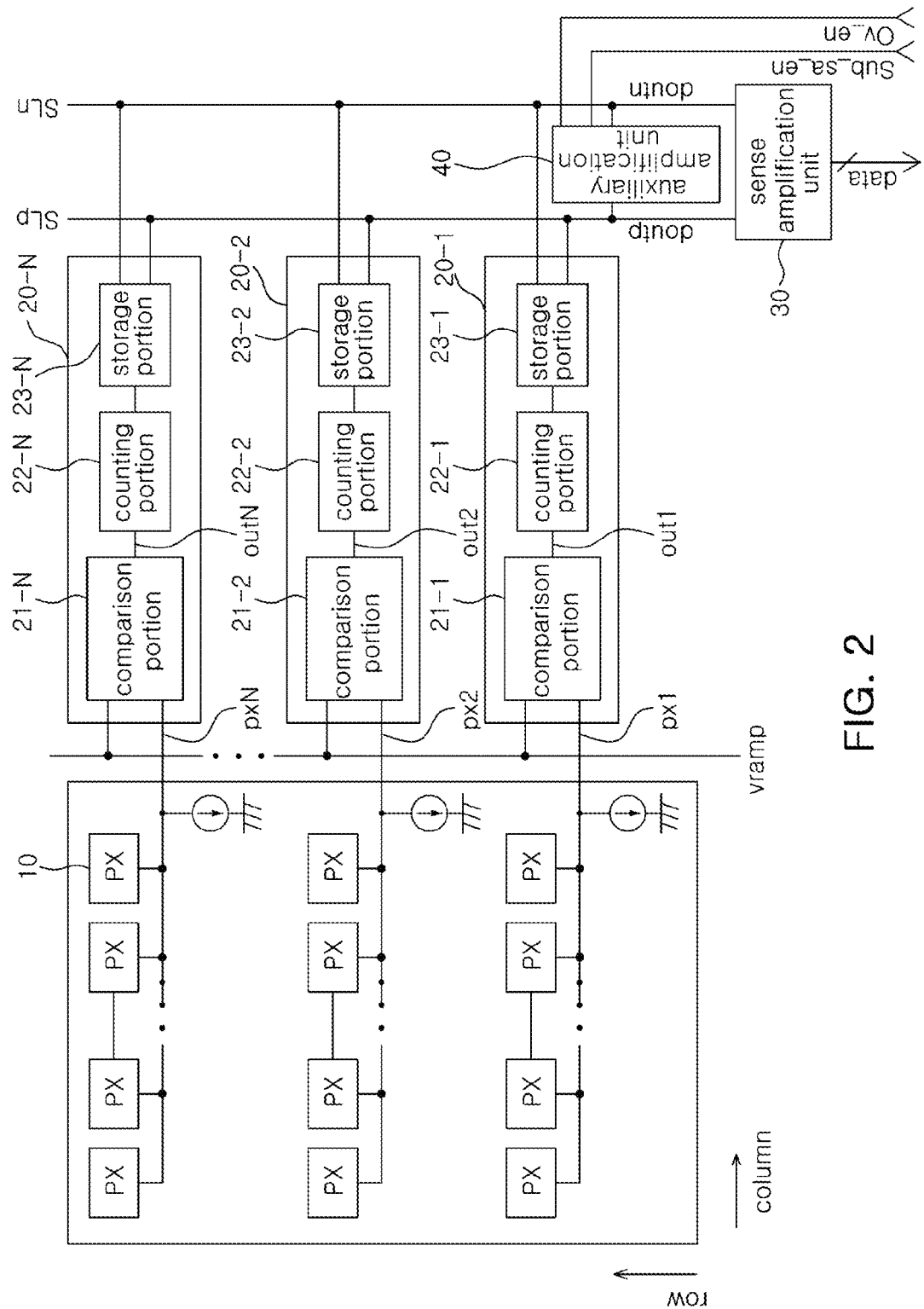
FIG. 2 is a block diagram of an image sensor according to an embodiment of the present invention.

FIG. 2 is a block diagram of an image sensor according to an embodiment of the present invention.

Referring to FIG. 2, an image sensor according to an embodiment of the present invention may include a plurality of pixels 10 disposed in a two-dimensional N×M structure, a plurality of sampling units 20-1 to 20-N in which the plurality of pixels 10 are connected in a column unit, and a sense amplifier 30 connected in common with the plurality of sampling units 20-1 to 20-N. The image sensor according to an embodiment of the present invention may further include an auxiliary amplification unit 40. The auxiliary amplification unit 40 may be positioned on a front stage of the sense amplification unit 30.

That is, the image sensor according to an embodiment of the present invention may include the auxiliary amplification unit 40 to amplify a signal of a sampled signal pair (doutp, doutn). For example, the auxiliary amplification unit 40 amplifies a voltage difference between a sampled signal doutp and a sampled signal doutn, provided to the sense amplification unit 30 through the auxiliary amplification unit 40. Then, the signal of the sampled signal pair (doutp, doutn) input to the sense amplification unit 30 rapidly reaches a predetermined voltage level or more and the sense amplification unit 30 may perform a relatively rapid data sensing operation.

Figure 3:
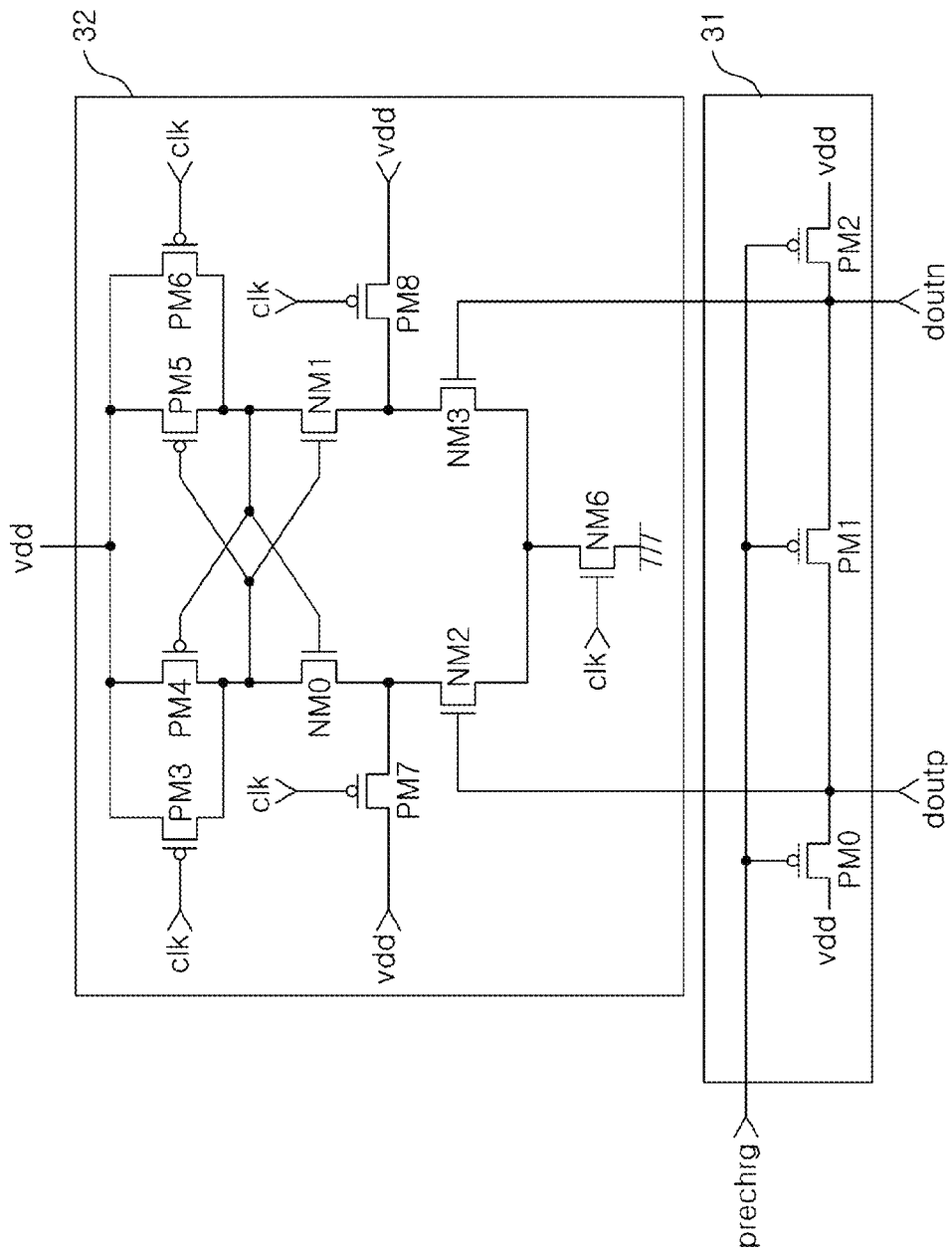
FIG. 3 is a circuit diagram of a sense amplification unit according to an embodiment of the present invention.

FIG. 3 is a circuit diagram of a sense amplification unit according to an embodiment of the present invention.

With reference to FIG. 3, the sense amplification unit 30 according to an embodiment of the present invention may include a signal input portion 31 precharging a signal line pair (SLp, SLn) at the time of a precharging operation. The sense amplification unit 30 may transfer the sampled signal pair (doutp, doutn) transmitted through the signal line pair (SLp, SLn) to a differential amplification portion 32 when the precharging operation is inactivated. The differential amplification portion 32 sensing the sampled signal pair (doutp, doutn) may generate and output data.

Hereinafter, respective elements will be described in detail.

The signal input portion 31 may include a zero PMOS transistor PM0 connected between a driving voltage input terminal vdd and an inverted signal line SLp. The zero PMOS transistor PM0 may be turned on or off in response to a precharge signal, prechrg. The signal input portion 31 may also include a first PMOS transistor PM1 connected between the inverted signal line SLp and a non-inverted signal line SLn. The first PMOS transistor PM1 may be turned on or off in response to the precharge signal, prechrg. The signal input portion 31 may further include a second PMOS transistor PM2 connected between the driving voltage input terminal vdd and the non-inverted signal line SLn. The second PMOS transistor PM2 may be turned on or off in response to the precharge signal, prechrg.

The differential amplification portion 32 may include fourth and fifth PMOS transistors PM4 and PM5 whose drains are connected to the driving voltage input terminal vdd and whose sources and gates are cross-connected to each other; third and sixth PMOS transistors PM3 and PM6 connected to be parallel with the fourth and fifth PMOS transistors PM4 and PM5 and turned on or off in response to a clock signal clk; zero and first NMOS transistors NM0 and NM1 whose drains and gates are cross-connected with sources of the fourth and fifth PMOS transistors PM4 and PM5; second and third NMOS transistors NM2 and NM3 whose drains are connected with sources of the zero and first NMOS transistors NM0 and NM1 and which are turned on or off according to the sampled signal pair (doutp, doutn); a sixth NMOS transistor NM6 connected between sources comprising the second and third NMOS transistors NM2 and NM3 and a ground and turned on or off in response to a clock signal clk; seventh and eighth PMOS transistors PM7 and PM8 whose drains are connected to the driving voltage input terminal vdd, whose sources are connected with sources of the zero and first NMOS transistors NM0 and NM1, and whose gates receive the clock signal clk inputted thereto; and the like.

Here, an output terminal of the differential amplification portion 32 may be connected to a source of the fifth PMOS transistor PM5 or a drain of the first NMOS transistor NM1.

Figure 4:
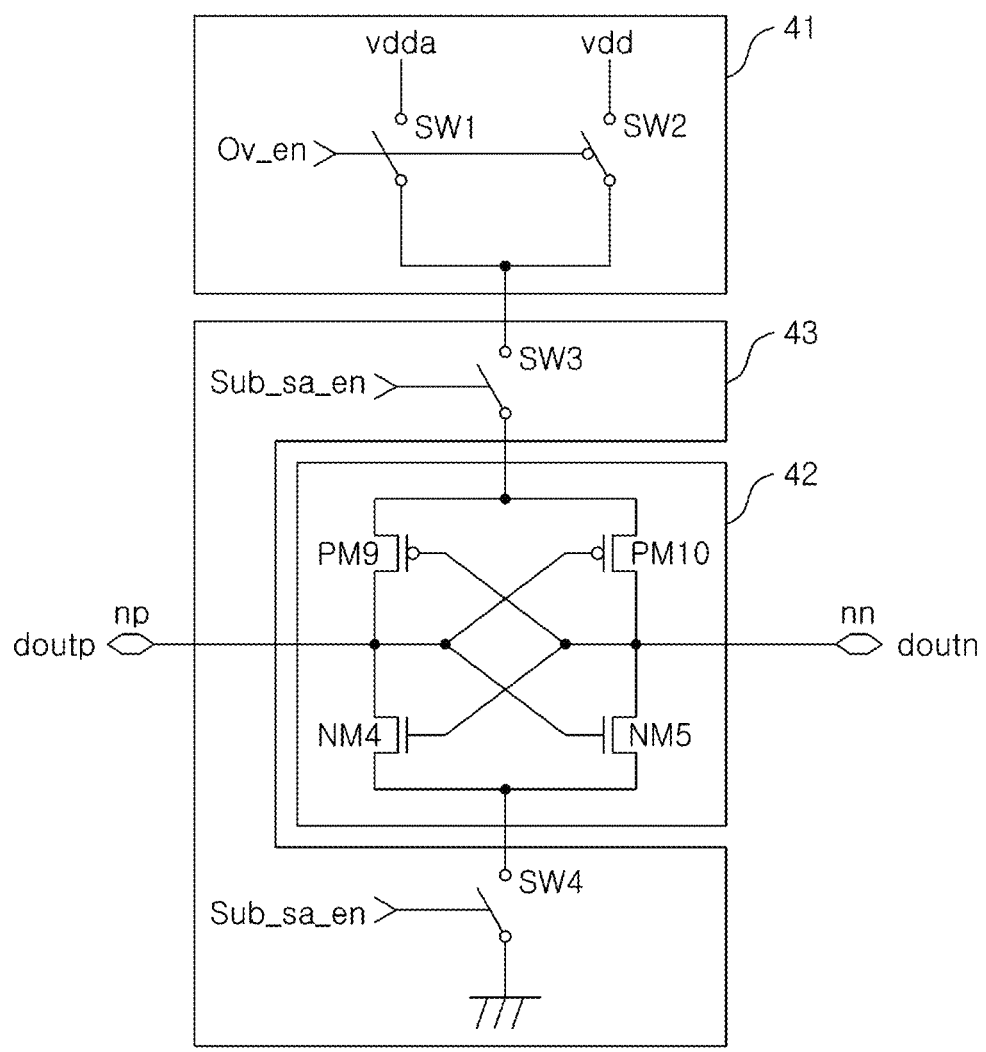
FIG. 4 is a circuit diagram of an auxiliary amplification unit according to an embodiment of the present invention.

FIG. 4 is a circuit diagram of the auxiliary amplification unit according to an embodiment of the present invention.

With reference to FIG. 4, the auxiliary amplification unit 40 according to an embodiment of the present invention may be a cross coupled latch type. That is, the auxiliary amplification unit 40 according to an embodiment of the present invention may include a voltage providing portion 41 temporarily providing a boosting voltage vdda having a voltage value higher than that of the driving voltage vdd. The boosting voltage vdda may be provided instead of providing the driving voltage vdd when a precharging operation is inactivated. The auxiliary amplification unit 40 may also include an amplifying portion 42 that rapidly increases a voltage difference between signals of the sampled signal pair (doutp, doutn) by using the boosting voltage vdda and then maintaining the increased voltage difference between signals of the sampled signal pair (doutp, doutn) by using the driving voltage vdd. The auxiliary amplification unit 40 may further include an operation control portion 43 activating operation of the amplifying portion 42 when the precharging operation is inactivated.

Here, the voltage providing portion 41 and the operation control portion 43 may respectively receive a boosting activation signal Ov_en and an operation activation signal Sub_sa_en from a configuration for generating and providing various control signals necessary for operation of an image sensor, such as a digital block (not shown), a timing control circuit (not shown), or the like, in order to perform the above-mentioned operation.

The boosting activation signal Ov_en has a characteristic in which it is temporarily activated when a precharging operation is inactivated and then it is again inactivated. The operation activation signal Sub_sa_en may be activated together with the boosting activation signal Ov_en, but the operation activation signal Sub_sa_en has a characteristic in which it is inactivated when the boosting activation signal Ov_en is inactivated and the precharging operation is again activated. An activation section Tov of the boosting activation signal Ov_en may be set or changed according to an operation condition of the image sensor, an external environment, or the like.

Hereinafter, the configuration of respective elements will be described in detail.

The voltage providing portion 41 may include a first switch SW1 connected between the boosting voltage input terminal vdda and a third switch SW3 of the operation control portion 43 and turned on when the boosting activation signal Ov_en is activated; and a second switch SW2 connected between the driving voltage input terminal vdd and the third switch SW3 of the operation control portion 43 and turned on when the boosting activation signal Ov_en is inactivated.

The amplifying portion 42 may be implemented by a cross-connected inverter, a latch type, for example, a cross coupled latch type, and in detail, may include ninth and tenth PMOS transistors PM9 and PM10 connected between the third switch SW3 of the operation control portion 43 and a signal node pair (np, nn) and having each source and gate cross-connected to each other; and fourth and fifth NMOS transistors NM4 and NM5 connected between sources of the ninth and tenth PMOS transistors PM9 and PM10 and a fourth switch SW4 of the operation control portion 43 and having each drain and gate cross-connected to each other. Here, the signal node pair (np, nn) may be connected to the signal line pair (SLp, SLn) transferring the sampled signal pair (doutp, doutn).

The operation control portion 43 may include the third switch SW3 connected between an output terminal of the voltage providing portion 41 and drains of the ninth and tenth PMOS transistors PM9 and PM10 and turned on when the operation activation signal Sub_sa_en is activated; and the fourth switch SW4 connected between sources of the fourth and fifth NMOS transistors NM4 and NM5 and a ground, and turned on when the operation activation signal Sub_sa_en is activated.

Figure 5A:
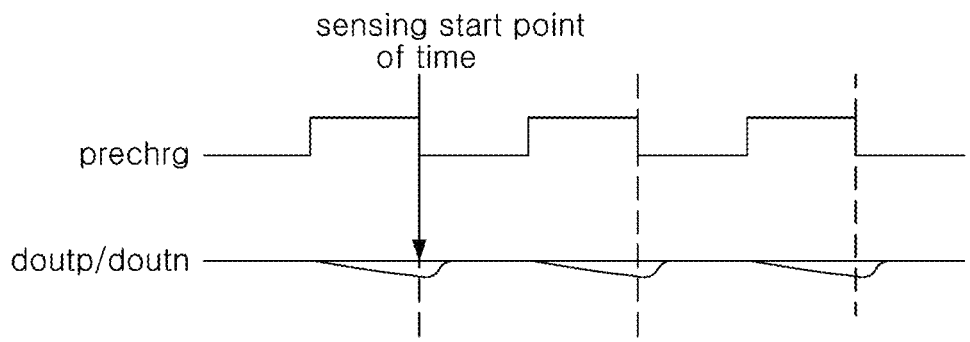
FIGS. 5A and 5B are drawings explaining an operation of an image sensor according to an embodiment of the present invention.
Figure 5B:
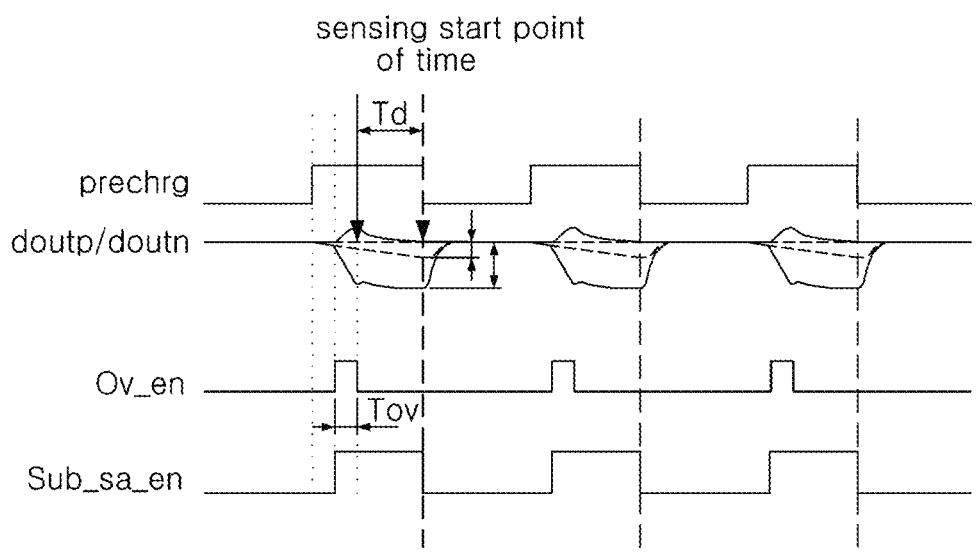

FIG. 5 is a drawing explaining an operation of an image sensor according to an embodiment of the present invention. FIG. 5A illustrates operation of an image sensor according to the related art, and FIG. 5B illustrates operation of an image sensor according to an embodiment of the present invention.

When a precharging operation is activated, the precharge signal, prechrg, may be transited to a low voltage level, and in response to the transition, the zero to the second PMOS transistors PM0 to PM2 of the sense amplification unit 30 shown in FIG. 3 may precharge the signal line pair (SLp, SLn) to a voltage level of the driving voltage vdd.

Thereafter, when the precharging operation is inactivated, the precharge signal, prechrg, may be transited to a high voltage level and an address may be generated and output. Then, the zero to the second PMOS transistors PM0 to PM2 stop the precharging operation and one of the plurality of storage portions 23-1 to 23-N, for example, 23-1, may start to output the sampled signal pair (doutp, doutn), and thus, a voltage difference between signals of the sampled signal pair (doutp, doutn) transmitted through the signal line pair (SLp, SLn) gradually starts to increase.

Subsequently, when the operation activation signal Sub_sa_en and the boosting activation signal Ov_en are simultaneously transited to a high voltage level, the voltage providing portion 41 may select and provide the boosting voltage vdda, and the amplifying portion 42 may rapidly increase a relatively small voltage difference V, of the sampled signal pair (doutp, doutn) by using the boosting voltage vdda. In addition, when the boosting activation signal Ov_en is again transited to a low voltage level, the voltage providing portion 41 may select and provide the driving voltage vdd instead of the boosting voltage vdda, and the amplifying portion 42 may maintain a voltage difference between signals of the sampled signal pair (doutp, doutn) by using the driving voltage vdd.

Therefore, the sense amplification unit 30 may receive the sampled signal pair (doutp, doutn) having the rapidly increased voltage difference, whereby a sensing operation can be performed and data can be output more rapidly.

That is, a voltage difference between signals of the sampled signal pair (doutp, doutn) according to the related art slowly increases as shown in FIG. 5A. According to an embodiment to the present invention, however, a voltage difference thereof rapidly increases as shown in FIG. 5B, and therefore, a sensing start point of time of the sense amplification unit 30 may be reduced by "Td" as shown in FIG. 5B and a data readout speed, namely, a clock rate, may be rapid by the reduced time Td.

As set forth above, according to embodiments of the present invention, operation at a high speed may be supported even in the case of employing a large number of pixels by amplifying a signal of a sampled signal pair provided to a sense amplification unit by using an auxiliary amplification unit provided additionally.

While the present invention has been shown and described in connection with the embodiments in the embodiments, it will be apparent to those skilled in the art that modifications and variations can be made without departing from the spirit and scope of the invention as defined by the appended claims.

What is claimed is:

1. An image sensor comprising:
    a plurality of sampling units sampling a pixel signal to output a sampled signal pair;
    an auxiliary amplification unit amplifying a signal of the sampled signal pair; and
    a sense amplification unit sensing a differential signal pair transmitted through the auxiliary amplification unit to generate output data,
    wherein the auxiliary amplification unit includes:
    a voltage providing portion temporarily providing a boosting voltage instead of a driving voltage when a precharging operation is inactivated;
    an amplifying portion increasing a voltage difference between signals of the sampled signal pair by using the boosting voltage, and thereafter, maintaining the increased voltage difference between signals of the sampled signal pair by using the driving voltage; and
    an operation control portion activating operation of the amplifying portion when the precharging operation is inactivated.

2. The image sensor of claim 1, wherein the voltage providing portion includes:
    a first switch providing the boosting voltage to the amplifying portion when a boosting activation signal is activated; and
    a second switch providing the driving voltage to the amplifying portion when the boosting activation signal is inactivated.

3. The image sensor of claim 2, wherein the auxiliary amplification unit is a cross coupled latch type.

4. The image sensor of claim 2, wherein the operation control portion includes:
    a third switch providing an output voltage from the voltage providing portion to the amplifying portion when an operation activation signal is activated; and
    a fourth switch generating a driving current of the amplifying portion when the operation activation signal is activated.

5. The image sensor of claim 4, wherein the boosting activation signal is temporarily activated when the precharging operation is inactivated, and is then again inactivated, and the operation activation signal is activated together with the boosting activation signal, and is inactivated when the boosting activation signal is again inactivated and the precharging operation is again activated.

* * * * *